(12) United States Patent
Walker et al.

(10) Patent No.: US 6,532,284 B2
(45) Date of Patent: Mar. 11, 2003

(54) METHOD AND SYSTEM FOR OPTIMIZING BANDWIDTH COST VIA CACHING AND OTHER NETWORK TRANSMISSION DELAYING TECHNIQUES

(75) Inventors: Paul Walker, Brooklyn, NY (US); Bertrand Des Pallieres, Condon (GB)

(73) Assignee: Morgan Guaranty Trust Company, New York, NY (US)

( * ) Notice: Subject to any disclaimer, the term of this patent is extended or adjusted under 35 U.S.C. 154(b) by 26 days.

(21) Appl. No.: 09/794,187

(22) Filed: Feb. 27, 2001

(65) Prior Publication Data
US 2002/0118806 A1 Aug. 29, 2002

(51) Int. Cl.$^7$ .................. H04M 17/00; H04M 15/00
(52) U.S. Cl. .................. 379/144.06; 379/114.03; 379/114.09; 379/128; 370/353; 370/355
(58) Field of Search ............... 379/114.01, 114.02, 379/114.03, 114.05, 114.07, 114.09, 115.01, 115.03, 121.04, 121.06, 125, 128; 370/353, 355

(56) References Cited

U.S. PATENT DOCUMENTS

| | | | | |
|---|---|---|---|---|
| 5,065,393 A | * | 11/1991 | Sibbitt et al. ............ | 370/58.2 |
| 5,692,233 A | | 11/1997 | Garman ................... | 705/36 |
| 5,751,799 A | * | 5/1998 | Mori ....................... | 379/114 |
| 5,802,499 A | | 9/1998 | Sampson et al. ........ | 705/35 |
| 5,812,988 A | | 9/1998 | Sandretto ................ | 705/36 |
| 5,819,237 A | | 10/1998 | Garman ................... | 705/36 |
| 5,819,238 A | | 10/1998 | Fernholz ................. | 705/36 |
| 5,845,265 A | | 12/1998 | Woolston ................. | 705/37 |
| 5,845,266 A | | 12/1998 | Lupien et al. ........... | 705/37 |
| 5,852,811 A | | 12/1998 | Atkins .................... | 705/36 |
| 5,884,286 A | | 3/1999 | Daughtery, III ......... | 705/36 |
| 5,893,078 A | | 4/1999 | Paulson .................. | 705/35 |
| 5,913,202 A | | 6/1999 | Motoyama ............... | 705/35 |
| 5,926,800 A | | 7/1999 | Baronowski et al. ..... | 705/35 |
| 5,940,810 A | | 8/1999 | Traub et al. ............. | 705/36 |
| 5,946,667 A | | 8/1999 | Tull, Jr. et al. ........... | 705/36 |
| 5,950,175 A | | 9/1999 | Austin .................... | 705/35 |
| 5,950,176 A | | 9/1999 | Keiser et al. ............ | 705/37 |
| 5,950,177 A | | 9/1999 | Lupien et al. ........... | 705/37 |
| 5,963,923 A | | 10/1999 | Garber ................... | 705/37 |
| 5,970,479 A | | 10/1999 | Shepherd ................ | 705/37 |
| 5,978,780 A | | 11/1999 | Watson ................... | 705/40 |
| 5,987,435 A | | 11/1999 | Weiss et al. ............. | 705/36 |
| 6,012,042 A | | 1/2000 | Black et al. ............. | 705/36 |
| 6,012,046 A | | 1/2000 | Lupien et al. ........... | 705/37 |
| 6,016,483 A | | 1/2000 | Rickard et al. .......... | 705/37 |

(List continued on next page.)

Primary Examiner—Binh Tieu
(74) Attorney, Agent, or Firm—Milbank, Tweed, Hadley & McCloy LLP

(57) ABSTRACT

Methods and systems for optimizing bandwidth pricing for a data transmission system electronically connected to a source of bandwidth spot prices, where the data transmission system transmits data as packets to a predetermined destination, are provided. In one embodiment, the method includes the steps of: determining whether data can be transmitted at a later time to the predetermined destination; providing acceptable price and a maximum acceptable time delay for transmitting the data that can be transmitted at a later time; providing the acceptable price and the maximum acceptable time delay in each packet formed from dividing the data; determining whether a data packet should be stored in a storage device by looking for presence of the acceptable price in the data packet; if the acceptable price is not found in the data packet, sending the data packet to the predetermined destination, and if the acceptable price is found in the data packet, storing the data packet in the storage device; comparing the acceptable price in the data packet with a spot bandwidth price from the source; and transmitting the data packet to the predetermined destination if the spot bandwidth price is at or below the acceptable price or if the maximum acceptable time delay of the packet has been reached.

21 Claims, 4 Drawing Sheets

U.S. PATENT DOCUMENTS

| | | | |
|---|---|---|---|
| 6,018,721 A | 1/2000 | Aziz et al. | 705/35 |
| 6,018,722 A | 1/2000 | Ray et al. | 705/35 |
| 6,021,397 A | 2/2000 | Jones et al. | 705/36 |
| 6,021,398 A | 2/2000 | Ausubel | 705/37 |
| 6,026,383 A | 2/2000 | Ausubel | 705/37 |
| 6,058,379 A | 5/2000 | Odom et al. | 705/37 |
| 6,061,662 A | 5/2000 | Makivic | 705/36 |
| 6,076,072 A | 6/2000 | Libman | 705/34 |
| 6,078,903 A | 6/2000 | Kealhofer | 705/36 |
| 6,078,904 A | 6/2000 | Rebane | 705/36 |
| 6,085,176 A | 7/2000 | Woolston | 705/37 |
| 6,088,685 A | 7/2000 | Kiron et al. | 705/36 |
| 6,092,056 A | 7/2000 | Tull, Jr. et al. | 705/36 |
| 6,098,051 A | 8/2000 | Lupien et al. | 705/37 |
| 6,205,211 B1 * | 3/2001 | Thomas et al. | 379/114 |
| 6,208,719 B1 * | 3/2001 | Lo et al. | 379/112 |
| 6,487,283 B2 * | 11/2002 | Thomas et al. | 379/112.01 |

* cited by examiner

METHOD AND SYSTEM FOR OPTIMIZING BANDWIDTH COST VIA CACHING AND OTHER NETWORK TRANSMISSION DELAYING TECHNIQUES

BACKGROUND OF THE INVENTION

Telephone companies have studied the issue of pricing the use of slack capacity in telecommunication networks. One pricing solution proposed is found in U.S. Pat. No. 5,848, 139 (the "'139 patent"), assigned to Telecommunications Research Laboratories. The '139 patent discloses a telecommunication traffic pricing control system. The system includes price controllers that receive slack capacity signals of corresponding trunk groups from a local access switch. The price controllers then unilaterally set the prices for the slack capacity. Subscriber agents monitor the prices set by the price controllers and when a price meets conditions satisfactory to a subscriber, the subscriber agent signals a service manager of its agreement to pay at that price. The service manager then sets up the connection and begins charging the subscriber agent for the time used at the agreed upon price.

While the pricing control system of the '139 patent may be satisfactory under certain circumstances, it is inherently inefficient in its structure. This is because the price for the slack capacity is not determined by a market of buyers and sellers, but rather, solely by the sellers in a take-it-or-leave-it fashion.

"Bandwidth" is the capacity of a specific medium for data transmission in a fixed interval of time. Internet bandwidth determines how much Internet content can be transferred in a given time. Due to the increasing importance of bandwidth in today's technology-driven world, bandwidth contracts are rapidly becoming an openly traded commodity. Companies such as Enron Corp., BandX Ltd., Arbinet-thexchange, Inc. and RateXchange Corp. are beginning to standardize contracts, which are then traded on exchanges. For example, RateXchange provides an exchange where members trade bandwidth contracts of three different durations: (i) "Rest of Month" spot contract is good from its immediate delivery to the end of the calendar month; (ii) Spot contracts of 1-month duration for delivery on the first business day of the month; and (iii) Forward contracts of 1-year duration for delivery on the first business day of each quarter.

While exchanges for trading bandwidth contracts are satisfactory for their desired purpose, these exchanges do not provide cost optimization of network data transmissions in many situations. For example, a broad class of applications (such as database replication and bursting delivery of large video files) need bandwidth at some point within a specified time frame, such as a few hours, days, or weeks after the data is generated or requested. As long as data transmission occurs within the time frame, it does not matter exactly when during the time frame the data transmission occurs. For these applications, trading of bandwidth contracts through the exchanges described above cannot effectively and efficiently capture optimal cost for network data transmissions because the existing systems do not provide a live, volatile, spot price for bandwidth.

What is desired, therefore, is a method and system that can leverage a trend towards liquid spot prices to optimize bandwidth costs for a broad variety of network transmissions.

BRIEF SUMMARY OF TECHNOLOGY UTILIZED BY EMBODIMENTS OF THE INVENTION

The embodiments of the present invention described herein utilize one or more of the following technologies. "IPv6", which stands for Internet Protocol version 6, is an expanded version of Internet Protocol ("IP") and is currently active at research sites and universities and has wide acceptance from the networking industry (e.g., Cisco Systems, Inc.). IPv4, which is what the Internet currently uses, is a routing technology whereby data are divided into packets and a routing table is utilized to look up where the data packets should be sent. This is performed by devices called routers which connect various networks and subnets inside networks. A computer or workstation can also perform routing and can contain routing tables of its own. IPv4 uses a 32 bit IP address to determine the next destination of the data packet. If there is no specific entry in the routing table for a particular data packet, then a default entry is used, and the packet sent on to the next router or destination.

IPv6 increases the IP address size from 32 bits to 128 bits, to support more levels of addressing hierarchy, a much greater number of addressable nodes and simpler auto-configuration of addresses. Scalability of multicast addresses is introduced. A new type of address called an anycast address is also defined, to send a data packet to any one of a group of nodes. Changes in the way IP header options are encoded allow more efficient forwarding, less stringent limits on the length of options, and greater flexibility for introducing new options. IPv6 thus allows for customizable and expandable headers on each data packet which permits relatively easy customization of packets.

TCP/IP stack/OS level network protocols are also utilized. "TCP" stands for Transmission Control Protocol and it provides a reliable stream delivery and virtual connection service to applications through the use of sequenced acknowledgment with retransmission of packets when necessary. The TCP header structure includes source port number and destination port number. "OS" stands for operating system.

While the embodiments of the invention are described with respect to IP routing technology, it should be apparent to one of ordinary skill in the art that ATM technology may be used instead or in conjunction with IP routing technology. "ATM" stands for Asynchronous Transfer Mode and it is a cell-switching protocol that can handle voice, data, and video communication simultaneously. ATM transfers data in packages referred to as ATM cells. Each cell is 53 bytes,- with the first 5 bytes being the header and the latter 48 bytes carrying data. ATM employs time-division-multiplexing ("TDM") to send its cells and to direct the cells (via ATM switches) to their correct physical destination in the network. ATM provides extremely high transfer rates (i.e., on the order of gigabits/second) and carries a quality of service guarantee for these transfers. In other words, if a certain transfer rate is needed/expected, ATM can guarantee that it will be provided.

SUMMARY OF THE INVENTION

The objects of the invention are achieved in one embodiment of the invention by a method for optimizing bandwidth pricing for a data transmission system electronically connected to a source of bandwidth spot prices, where the data transmission system transmits data as packets to a predetermined destination. This method includes the steps of: determining whether data can be transmitted at a later time to the predetermined destination; providing acceptable price and maximum acceptable time delay for transmitting the data that can be transmitted at a later time; providing the acceptable price and the maximum acceptable time delay in each packet formed from dividing the data; determining whether a data packet should be stored in a storage device by looking for presence of the acceptable price in the data packet; if the acceptable price is not found in the data packet, sending the data packet to the predetermined destination, and if the acceptable price is found in the data packet, storing the data packet in the storage device; comparing the acceptable price in the data packet with a spot bandwidth price from the source; and transmitting the data packet to the predetermined destination if the spot bandwidth price is at or below the acceptable price or if the maximum acceptable time delay of the packet has been reached.

The objects of the invention are achieved in one embodiment of the invention by a system for optimizing bandwidth pricing for a data transmission system, where the data transmission system transmits data as packets to a predetermined destination. This optimization system includes: first software operable on the data transmission system for providing acceptable price and maximum acceptable time delay for data that can be transmitted at a later time; second software operable on the data transmission system for providing the acceptable price and the maximum acceptable time delay to each packet formed from dividing the data; a storage device for storing packets having the acceptable price, where the storage device is electronically connected to a source of bandwidth spot prices; and the storage device transmitting the packets to the predetermined destination if a spot bandwidth price is at or below the acceptable price or if the maximum acceptable time delay has been reached.

BRIEF DESCRIPTION OF THE DRAWINGS

There will now be described preferred embodiments of the invention with reference to drawings, by way of illustration only and not with the intention of limiting the scope of the invention, in which like numerals denote like elements and in which.

DETAILED DESCRIPTION OF THE PREFERRED EMBODIMENTS

Figure 1:
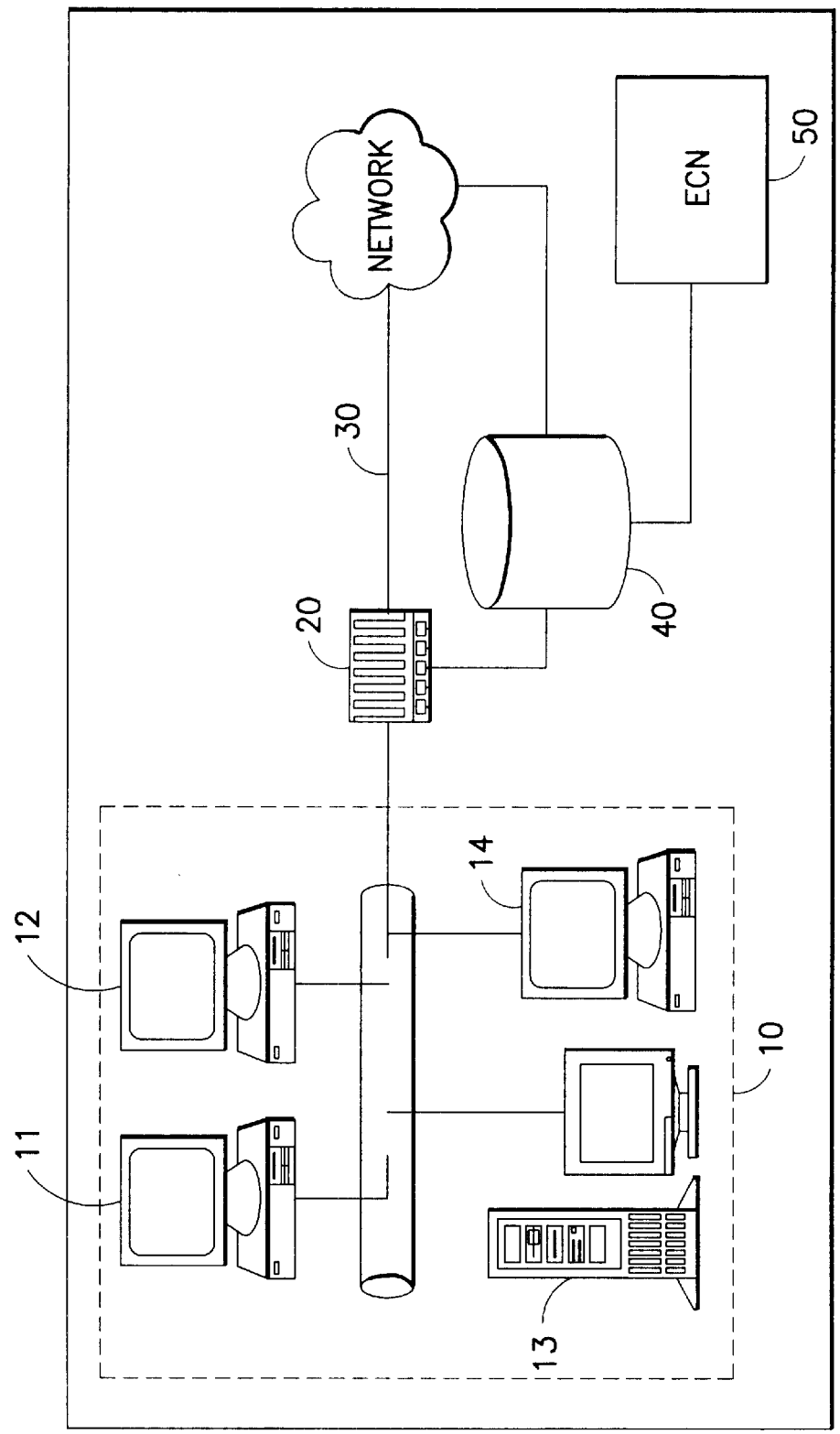
FIG. 1 shows one embodiment of a bandwidth cost optimization system of the present invention.

FIG. 1 shows one embodiment of a bandwidth cost optimization system of the present invention. The system includes a local area network ("LAN") 10 having a plurality of computers 11–14 connected thereto, and a telecommunication link 30 electronically connected to the LAN 10 via a router 20. The telecommunication link 30 may be a telephone line, cable line, optical fibers, a satellite/wireless link, or any other telecommunication link capable of data transfer known to one of ordinary skill in the art. Cost for using the telecommunication link 30 is dependent upon various factors, e.g., time of the day of use. While not shown in the drawings, one or more additional LANs and/or wide area networks ("WANs") are also electronically connected to the telecommunication link 30.

A storage device 40 is electronically connected to the router 20 and the telecommunication link 30. As described in greater detail below, the storage device 40 stores data packets that are not routed through to the telecommunication link 30 by the router 20. In the embodiment of FIG. 1, the storage device 40 is separate from the router 20. It should be apparent to one of ordinary skill in the art that the function of the storage device could also be built into the router 20, rather than having a separate storage device. A source 50 of bandwidth spot prices, including the spot prices for using the telecommunication link 30, is electronically connected to the storage device 40. Such a source of bandwidth spot prices may be an Electronic Communications Network ("ECN"), which is a computerized system that automatically matches orders between buyers and sellers.

Figure 2:
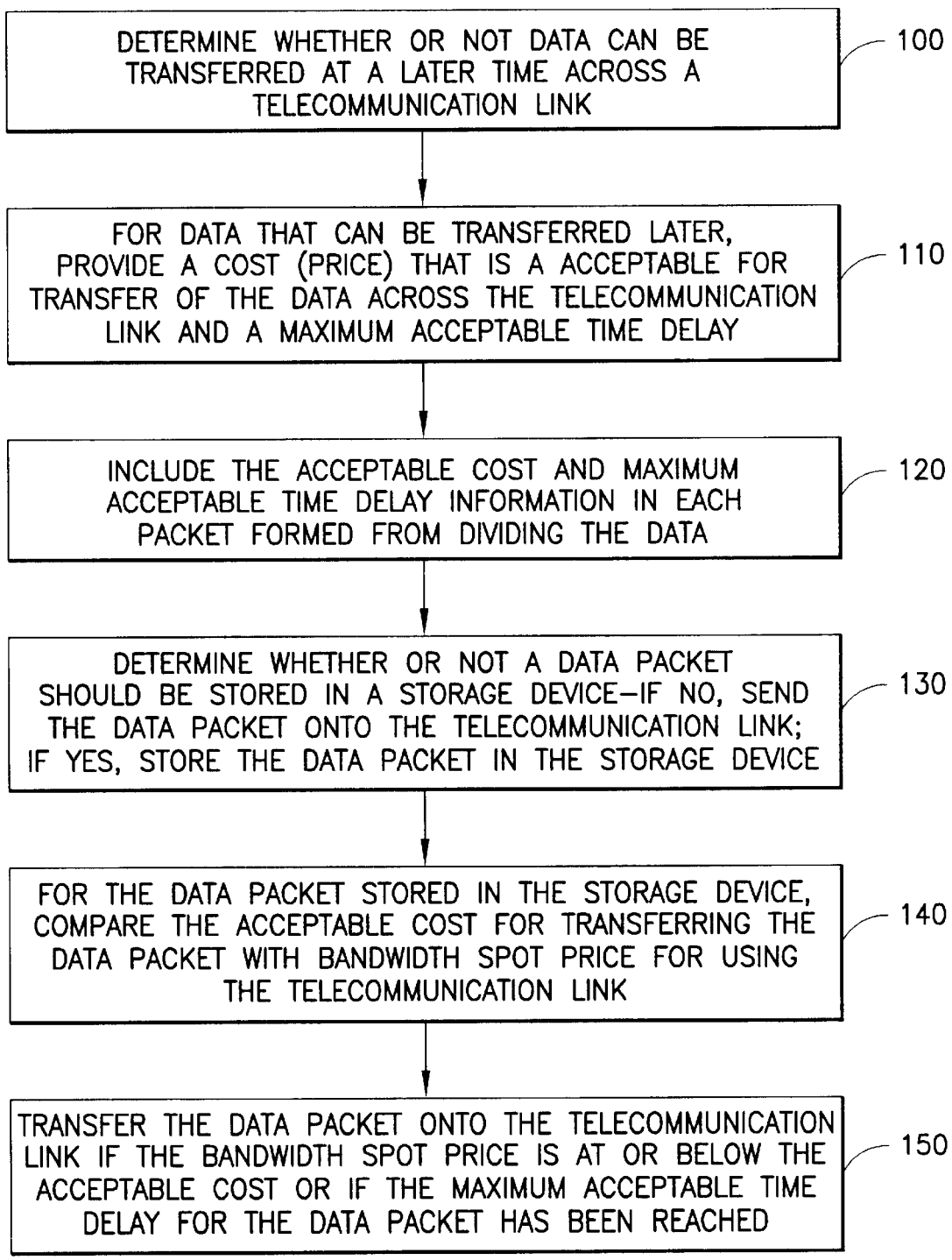
FIG. 2 is a flowchart showing the operation of the bandwidth cost optimization system of FIG. 1.

The operation of the bandwidth cost optimization system of FIG. 1 will be explained with reference to the flowchart of FIG. 2. At step 100, a determination is made as to whether or not data can be transferred at a later time across the telecommunication link 30. For example, database replication data may not have to be transferred immediately across the telecommunication link 30. It may have to be transferred at some point within a specified time frame, such as within 24 hours. The determination of step 100 may be made by a user (including an administrator) of the LAN 10 or by a computer electronically connected to the LAN 10. For data that can be transferred later, a cost (price) that is acceptable for transferring the data across the telecommunication link 30 is provided at step 110. In addition, a maximum acceptable time delay is also preferably provided. For the database replication data example, let's assume is that the acceptable price is X and the maximum acceptable time delay is 24 hours. This acceptable price and the maximum acceptable time delay are determined by a user (including an administrator) of the LAN 10 or by a computer electronically connected to the LAN 10.

Before data can be transferred across the telecommunication link 30, it must be divided into packets in accordance with Internet Protocol. At step 120, the acceptable cost and the maximum acceptable time delay information are included in each data packet formed from the data. For the database replication data example, each packet formed from dividing the database replication data includes the acceptable price=X and the maximum acceptable time delay=24 hours information. Preferably, this acceptable cost and maximum acceptable time delay information are provided in the header of each data packet by using IPv6. Although IPv6 is preferred, it should be apparent to one of ordinary skill in the art that other protocol conventions may be used as well.

At step 130, it must be determined whether or not a data packet should be stored in the storage device 40. In the present embodiment, data that must be sent immediately across the telecommunication link 30 are not provided with acceptable cost information. Thus, packets formed from dividing such data do not have acceptable cost information provided in the header. These packets are routed through to the telecommunication link 30 by the router 20 of FIG. 1. Packets containing the acceptable cost information are sent to the storage device 40 for storage. While the present embodiment does not provide acceptable cost information for data that must be sent immediately across the telecommunication link 30, it should be apparent to one of ordinary skill in the art that acceptable cost information can be provided to all data, whether or not such data can be sent at a later time. In this case, the acceptable cost information must be set to infinity or a logical representation thereof, such as zero or another special value for data that must be transferred immediately.

For the data packets that are stored in the storage device 40, the storage device 40 (or alternatively, a comparator device electronically connected to the storage device 40 and the source 50) compares the acceptable cost information in the data packets with bandwidth spot prices from the source 50. This is at step 140 of FIG. 2. When the spot price for using the telecommunication link 30 is at or below the acceptable cost, the storage device 40 (or alternatively, the comparator device) signals an offer of acceptance of the spot price to the source 50. If the offer of the spot price is accepted, then the data packet is caused to be transferred onto the telecommunication link 30 by the storage device 40. Even if the spot price for using the telecommunication link 30 is not at or below the acceptable cost, the data packet is caused to be transferred onto the telecommunication link 30 by the storage device 40 if the maximum acceptable time delay for the data packet has been reached. This is at step 150.

In an alternative to the embodiment of FIG. 1, the storage device 40 may be positioned between the LAN 10 and the router 20 such that packets sent by the LAN 10 are first received in the storage device 40. The storage device 40 stores the packets containing acceptable cost information and immediately forwards the packets that do not have the acceptable cost information to the router 20.

Figure 3:
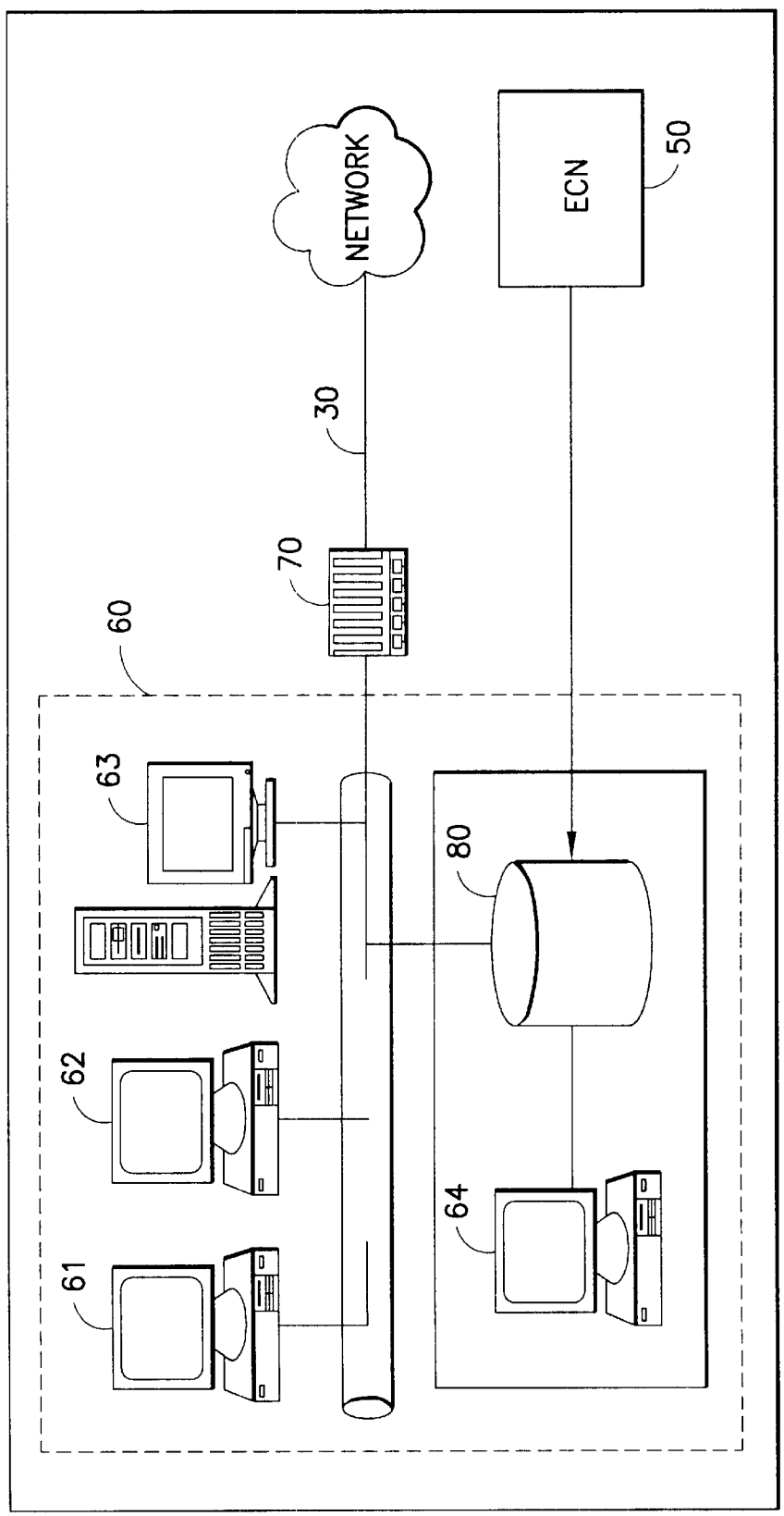
FIG. 3 shows another embodiment of a bandwidth cost optimization system of the present invention.

FIG. 3 shows another embodiment of a bandwidth cost optimization system of the present invention. The system includes a local area network ("LAN") 60 having a plurality of computers 61–64 connected thereto, and the telecommunication link 30 electronically connected to the LAN 60 by a router 70. As in FIG. 1, the telecommunication link 30 may be a telephone line, cable line, optical fibers, a satellite/wireless link, or any other telecommunication link capable of data transfer known to one of ordinary skill in the art. Cost for using the telecommunication link 30 is dependent upon various factors, e.g., time of the day of use. While not shown, one or more additional LANs and/or wide area networks ("WANs") are also electronically connected to the telecommunication link 30.

A storage device 80 is electronically connected to the LAN 60, and in the embodiment of FIG. 3, forms a part of the LAN 60. As described in greater detail below, the storage device 80 stores data packets that are not sent to the router 70 by the LAN 60. The source 50 of bandwidth spot prices, including the spot prices for using the telecommunication link 30, is electronically connected to the storage device 80. As in FIG. 1, such a source of bandwidth spot prices may be an ECN.

Figure 4:
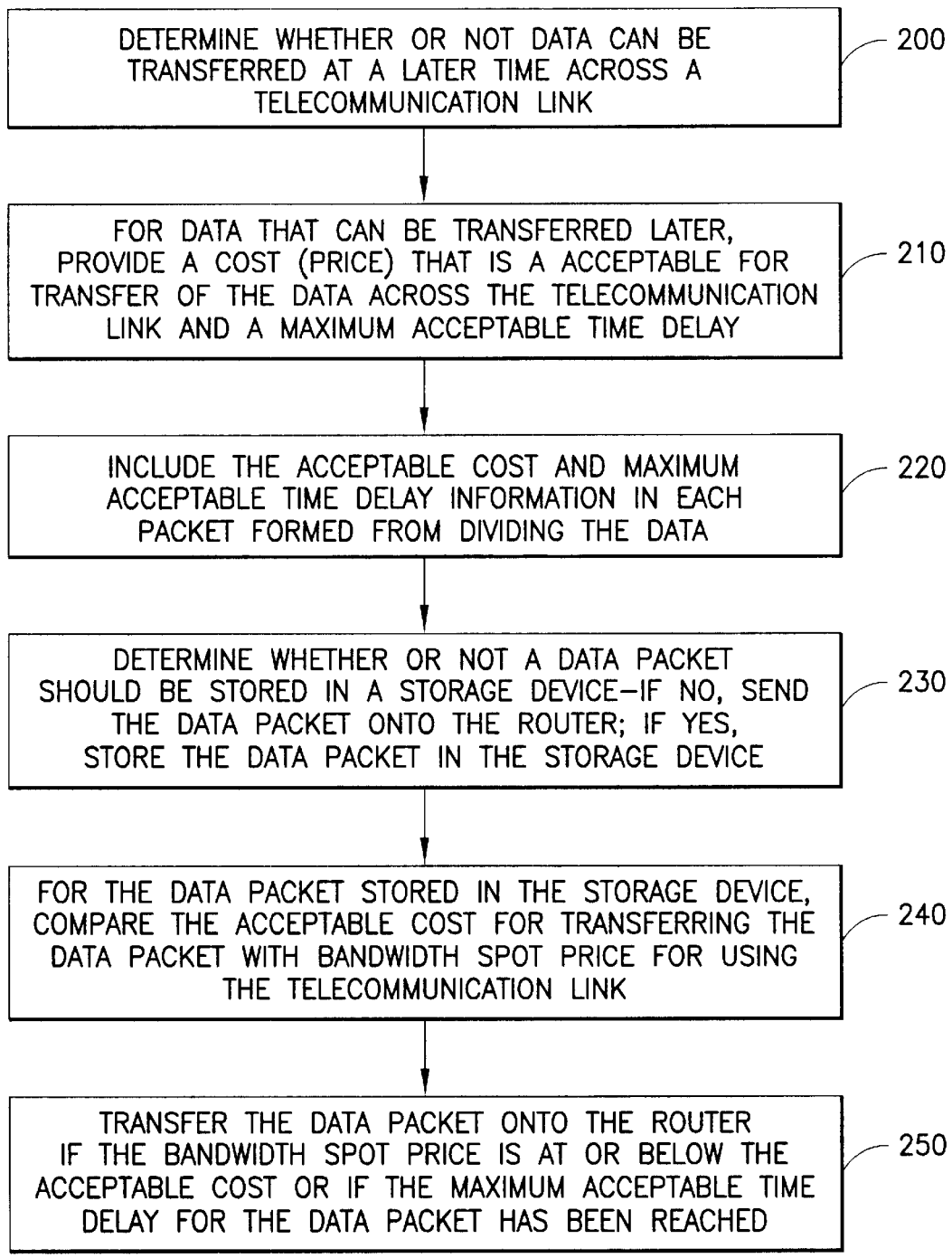
FIG. 4 is a flowchart showing the operation of the bandwidth cost optimization system of FIG. 3.

The operation of the bandwidth cost optimization system of FIG. 3 will be explained with reference to the flowchart of FIG. 4. At step 200, a determination is made as to whether or not data can be transferred at a later time across the telecommunication link 30. For example, large video files may not have to be transferred immediately across the telecommunication link 30. Such video files may have to be transferred at some point within a specified time frame, such as within 72 hours. The determination of step 200 may be made by a user (including an administrator) of the LAN 60 or by a computer electronically connected to the LAN 60. For data that can be transferred later, a cost (price) that is acceptable for transferring the data across the telecommunication link 30 is provided at step 210. In addition, a maximum acceptable time delay is also preferably provided. For the large video files example, let's assume that the acceptable price is Y and the maximum acceptable time delay is 72 hours. This acceptable price is determined by a user (including an administrator) of the LAN 60 or by a computer electronically connected to the LAN 60.

Before data can be transferred across the telecommunication link 30, it must be divided into packets in accordance with Internet Protocol. At step 220, the acceptable cost and the maximum acceptable time delay information are included in each packet formed from the data. For the large video files example, each data packet formed from dividing the video files includes the acceptable price=Y and the maximum acceptable time delay=72 hours information. Preferably, this acceptable cost and the maximum acceptable time delay information are provided in the header of each data packet by using IPv6. Although IPv6 is preferred, it should be apparent to one of ordinary skill in the art that other protocol conventions may be used as well.

At step 230, it must be determined whether or not a data packet should be stored in the storage device 80. In the present embodiment, data that must be sent immediately across the telecommunication link 30 are not provided with acceptable cost information. Thus, packets formed from dividing such data do not have acceptable cost information provided in the header. These packets are routed through to the telecommunication link 30 via the router 70 of FIG. 3. Packets containing the acceptable cost information are sent to the storage device 80 for storage. While the present embodiment does not provide acceptable cost information for data that must be sent immediately across the telecommunication link 30, it should be apparent to one of ordinary skill in the art that acceptable cost information can be provided to all data, whether or not such data can be sent at a later time. In this case, the acceptable cost information must be set to infinity or a logical representation thereof, such as zero or another special value for data that must be transferred immediately.

For the data packets that are stored in the storage device 80, the storage device 80 (or alternatively, a computer of the LAN 60 electronically connected to the storage device 80 and the source 50) compares the acceptable cost information in the data packets with bandwidth spot prices from the source 50. This is at step 240 of FIG. 4. When the spot price for using the telecommunication link 30 is at or below the acceptable cost, the storage device 80 (or alternatively, the computer of the LAN 60) signals an offer of acceptance of the spot price to the source 50. If the offer of the spot price is accepted, then the data packet is caused to be transferred onto the router 70 by the storage device 80. Even if the spot price for using the telecommunication link 30 is not at or below the acceptable cost, the data packet is caused to be transferred onto the router 70 by the storage device 80 if the maximum acceptable time delay for the data packet has been reached. This is at step 250.

In the alternative, after step 210 but before dividing the data into packets in accordance with IP, the system may determine whether or not the data should be stored in the storage device 80. If the data has acceptable cost information associated therewith, then such data and corresponding acceptable cost and maximum acceptable time delay information are stored in the storage device 80. If the data do not have acceptable cost information associated therewith, then such data are forwarded immediately to IP software for dividing into packets and sending onto the router 70. For data stored in the storage device 80, the storage device 80 (or alternatively, a computer of the LAN 60 electronically connected to the storage device 80 and the source 50) compares the acceptable cost for the data with bandwidth spot prices from the source 50. When the spot price for using the telecommunication link 30 is at or below the acceptable cost information and such spot price is accepted or if the maximum acceptable time delay has been reached, the data are caused to be sent to the IP software for dividing into packets and sending onto the router 70.

The embodiment of FIG. 3 could be implemented purely in software, requiring no modifications of routing tables or IP headers. For example, this could be done by modifying the underlying OS or network stack, or by providing a polymorphically equivalent implementation of TCP/IP (e.g., Unix sockets or WinSock) which calls the fundamental implementation at a low level, implements storing/caching, and provides an identical TCP/IP stack to the application programmer.

In the software/OS level embodiment shown in FIG. 3, the OS or TCP/IP stack intercepts the packets and, if the acceptable cost information is indicated, pushes the packets into a storage area (either RAM or a portion of the local hard drive). There is provided a special library which is polymorphically identical to standard TCP/IP but which wraps in a bandwidth limiter. This requires no low level or OS modification. This allows a programmer to simply re-compile the code against the new library. "Polymorphism" as used herein means the technique of providing an identical set of functions with a modified functionality (whether object-oriented or non object-oriented).

Those skilled in the art will recognize that the method and system of the present invention has other applications, and that the present invention is not limited to the representative examples disclosed herein. Moreover, the scope of the present invention covers conventionally known variations and modifications to the system described herein, as would be known by those skilled in the art.

What is claimed is:

1. A method for optimizing bandwidth pricing for a data transmission system electronically connected to a source of bandwidth spot prices, the data transmission system transmitting data as packets to a predetermined destination, which method comprises:
   determining whether delaying transmission of data to the predetermined destination is appropriate;
   providing acceptable price for transmitting said data that can be transmitted at a later time;
   providing maximum acceptable time delay for transmitting said data that can be transmitted at a later time;
   providing said acceptable price and said maximum acceptable time delay within each packet formed from dividing said data;
   determining whether a data packet should be stored in a storage device by looking for presence of said acceptable price within said data packet;
   if said acceptable price is not found within said data packet, sending said data packet to the predetermined destination, and if said acceptable price is found within said data packet, storing said data packet in the storage device;
   comparing said acceptable price within said data packet with a spot bandwidth price from the source; and
   transmitting said data packet to the predetermined destination if said spot bandwidth price is at or below said acceptable price or if said maximum acceptable time delay for said packet has been reached.

2. The method of claim 1, wherein said acceptable price is provided to each said packet formed from dividing said data by utilizing IPv6.

3. The method of claim 1, wherein said acceptable price is provided in the header of each said packet formed from dividing said data.

4. The method of claim 1, wherein the source of bandwidth spot prices is an Electronic Communications Network.

5. A method for optimizing bandwidth pricing for a data transmission system electronically connected to a source of bandwidth spot prices, the data transmission system transmitting data as packets to a predetermined destination, which method comprises:
   determining whether delaying transmission of data to the predetermined destination is appropriate;
   providing acceptable price for transmitting said data that can be transmitted at a later time;
   providing maximum acceptable time delay for transmitting said data that can be transmitted at a later time;
   determining whether data should be stored in a storage device by looking for presence of said acceptable price associated with said data;
   if said acceptable price is not found for said data, dividing said data into packets and sending said packets to the predetermined destination, and if said acceptable price is found for said data, storing said data in the storage device;
   comparing said acceptable price for said data with a spot bandwidth price from the source;
   dividing said data into packets;
   providing said acceptable price and said maximum acceptable time delay within each of said packets; and
   transmitting said packets to the predetermined destination if said spot bandwidth price is at or below said acceptable price or if said maximum acceptable time delay for said data has been reached.

6. The method of claim 5, wherein the source of bandwidth spot prices is an Electronic Communications Network.

7. A system for optimizing bandwidth pricing for a data transmission system, the data transmission system transmitting data as packets to a predetermined destination, which optimization system comprises:
   first software operable on the data transmission system to provide acceptable price and maximum acceptable time delay for data that can be transmitted at a later time;
   second software operable on the data transmission system for including said acceptable price and said maximum acceptable time delay within each packet formed from dividing said data;
   a storage device for storing packets having said acceptable price within said packet, said storage device electronically connected to a source of bandwidth spot prices; and
   said storage device transmitting said packets to the predetermined destination if a spot bandwidth price is at or below said acceptable price or if said maximum acceptable time delay has been reached.

8. The system of claim 7, wherein said second software includes IPv6.

9. The system of claim 7, wherein the data transmission system is a local area network.

10. The system of claim 7, further comprising a router which routes said packets having said acceptable price to said storage device.

11. The system of claim 7, wherein the source of bandwidth spot prices is an Electronic Communications Network.

12. A method for optimizing bandwidth pricing for a data transmission system electronically connected to a source of bandwidth spot prices, the data transmitting system transmitting data as packets to a predetermined destination, the method comprising:

determining an acceptable price for transmitting said data packets at a later time;

determining a maximum acceptable time delay for transmitting said data packets at a later time;

including the acceptable price and the maximum acceptable time delay within each data packet; and determining whether a data packet should be stored in a storage device by the presence or absence of the acceptable price within the data packet.

13. The method of claim 12, further comprising:

sending the data packet to the predetermined location without storing the data packet in the storage device if the acceptable price is not within the data packet.

14. The method of claim 12, further comprising:

storing the data packet in the storage device if the acceptable price is within the data packet.

15. The method of claim 12, further comprising:

comparing the acceptable price within the data packet with a spot bandwidth price from the source of bandwidth spot prices.

16. The method of claim 12, further comprising:

comparing the maximum acceptable time delay within the data packet with a current delay of the data packet.

17. The method of claim 12, further comprising:

transmitting the data packet to the predetermined destination if a spot bandwidth price from the source of bandwidth spot prices is at or below the acceptable price.

18. The method of claim 12, further comprising:

transmitting the data packet to the predetermined destination if the maximum acceptable time delay for the data packet has been reached.

19. Computer executable software code transmitted as an information signal, the code for optimizing bandwidth pricing for a data transmission system electronically connected to a source of bandwidth spot prices, the data transmission system transmitting data as packets to a predetermined destination, the code comprising:

code to determine whether delaying transmission of data to the predetermined destination is appropriate;

code to provide acceptable price for transmitting said data that can be transmitted at a later time;

code to provide maximum acceptable time delay for transmitting said data that can be transmitted at a later time;

code to provide said acceptable price and said maximum acceptable time delay within each packet formed from dividing said data;

code to determine whether a data packet should be stored in a storage device by looking for presence of said acceptable price within said data packet;

if said acceptable price is not found within said data packet, code to send said data packet to the predetermined destination, and if said acceptable price is found within said data packet, code to store said data packet in the storage device;

code to compare said acceptable price within said data packet with a spot bandwidth price from the source of bandwidth spot prices; and code to transmit said data packet to the predetermined destination if said spot bandwidth price is at or below said acceptable price or if said maximum acceptable time delay for said packet has been reached.

20. A computer-readable medium having computer executable software code stored thereon, the code for optimizing bandwidth pricing for a data transmission system electronically connected to a source of bandwidth spot prices, the data transmission system transmitting data as packets to a predetermined destination, the code comprising:

code to determine whether delaying transmission of data to the predetermined destination is appropriate;

code to provide acceptable price for transmitting said data that can be transmitted at a later time;

code to provide maximum acceptable time delay for transmitting said data that can be transmitted at a later time;

code to provide said acceptable price and said maximum acceptable time delay within each packet formed from dividing said data;

code to determine whether a data packet should be stored in a storage device by looking for presence of said acceptable price within said data packet;

if said acceptable price is not found within said data packet, code to send said data packet to the predetermined destination, and if said acceptable price is found within said data packet, code to store said data packet in the storage device;

code to compare said acceptable price within said data packet with a spot bandwidth price from the source of bandwidth spot prices; and code to transmit said data packet to the predetermined destination if said spot bandwidth price is at or below said acceptable price or if said maximum acceptable time delay for said packet has been reached.

21. A programmed computer for optimizing bandwidth pricing for a data transmission system electronically connected to a source of bandwidth spot prices, the data transmission system transmitting data as packets to a predetermined destination, comprising:

a memory having at least one region for storing computer executable program code; and a processor for executing the program code stored in the memory; wherein the program code comprises:

code to determine whether delaying transmission of data to the predetermined destination is appropriate;

code to provide acceptable price for transmitting said data that can be transmitted at a later time;

code to provide maximum acceptable time delay for transmitting said data that can be transmitted at a later time;

code to provide said acceptable price and said maximum acceptable time delay within each packet formed from dividing said data;

code to determine whether a data packet should be stored in a storage device by looking for presence of said acceptable price within said data packet;

if said acceptable price is not found within said data packet, code to send said data packet to the predetermined destination, and if said acceptable price is found within said data packet, code to store said data packet in the storage device;

code to compare said acceptable price within said data packet with a spot bandwidth price from the source of bandwidth spot prices; and code to transmit said data packet to the predetermined destination if said spot bandwidth price is at or below said acceptable price or if said maximum acceptable time delay for said packet has been reached.

* * * * *

UNITED STATES PATENT AND TRADEMARK OFFICE
CERTIFICATE OF CORRECTION

PATENT NO.   : 6,532,284 B2
DATED        : March 11, 2003
INVENTOR(S)  : Paul Walker and Bertrand Des Pallieres It is certified that error appears in the above-identified patent and that said Letters Patent is hereby corrected as shown below:

<u>Title page,</u>
Item [75], should read:

-- [75] Inventors: Paul Walker, Brooklyn, NY (US);
Bertrand Des Pallieres, London (GB) --

Signed and Sealed this

Nineteenth Day of August, 2003

JAMES E. ROGAN
*Director of the United States Patent and Trademark Office*